March 2, 1965 W. H. DECKER ETAL Re. 25,738
GARMENT BUTTON AND MEANS AND METHOD OF MAKING SAME
Original Filed Nov. 5, 1957
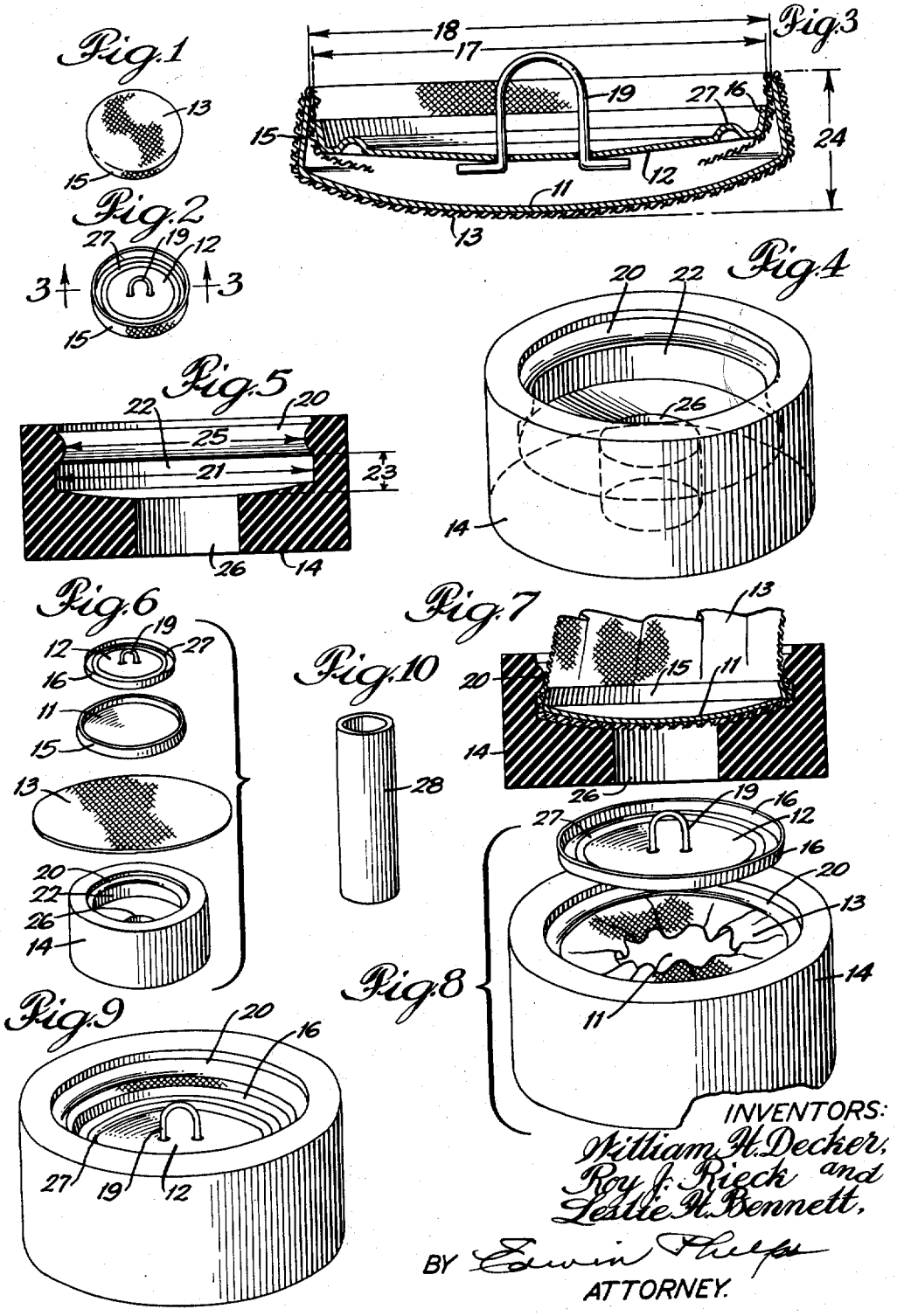
INVENTORS:
William H. Decker,
Roy J. Rieck and
Leslie H. Bennett,
BY Edwin Phelps
ATTORNEY.

United States Patent Office

Re. 25,738
Reissued Mar. 2, 1965

25,738

GARMENT BUTTON AND MEANS AND METHOD OF MAKING SAME

William H. Decker, Roy J. Rieck, and Leslie H. Bennett, Cook County, Ill., assignors to Maxant Button and Supply Co., Chicago, Ill., a corporation of Illinois Original No. 2,993,392, dated July 25, 1961, Ser. No. 694,611, Nov. 5, 1957. Application for reissue July 19, 1963, Ser. No. 300,118
5 Claims. (Cl. 24—113)

Matter enclosed in heavy brackets [ ] appears in the original patent but forms no part of this reissue specification; matter printed in italics indicates the additions made by reissue.

This invention relates to a very conventional type of garment button formed by two nested flanged disks with a piece of fabric overlying the face of the outer disk, the perimetrical portion of the fabric interposed between the flanges of the nested disks.

Buttons of this kind generally are used on feminine garments. It is a conventional practice for dressmakers to make such fabric-covered buttons using pieces of the fabric from which a garment is made, or pieces of fabric which acceptably could be associated with the garment fabric. Metal disks for the making of such type of buttons are obtainable through channels which market dressmaking accessories.

The main objects of this invention are to provide an improved form of fabric-covered buttons; to provide an improved form of flanged disks dimensioned to be permanently retained in interlocked nested relationship by the perimetrical portion of the fabric, which overlies the face of the outer disk, being interposed between the disk flanges; to provide an improved method of assembling a pair of flanged disks and a piece of fabric to permanently retain the disks in interlocked nested relationship by the fabric being interposed between the nested flanges; to provide an improved form of tool adapted to tauten a piece of fabric over the face of a flanged disk and position the perimetrical portion of the fabric within the disk flange to permit a second flanged disk to be depressed into the first disk and become permanently retained in nested relationship by the intervening fabric; and to provide an improved fabric-covered button and tool for assembling the same, both of which are simple in construction, very economical to manufacture, and extremely facile to use.

In the embodiment of this invention shown in the accompanying drawings;

FIG. 1 is an obverse view of a fabric-faced garment-button constructed in accordance with this invention;

FIG. 2 is a reverse perspective view of the same;

FIG. 3 is a much-enlarged transverse sectional view of the finished button, taken on the plane of the line 3—3 of FIG. 2;

FIG. 4 is a perspective view of the element wherein the various parts of the button are assembled;

FIG. 5 is a transverse sectional view of the same;

FIG. 6 is an exploded view of the several parts involved in the construction of buttons in accordance with this invention;

FIG. 7 is an enlarged, transverse sectional view of the first step in producing buttons in accordance with this invention;

FIG. 8 is an exploded perspective view of two subsequent steps in producing the buttons;

FIG. 9 is a perspective view of the finished button in the assembling elements; and FIG. 10 is a perspective view of an auxiliary tool used to press the disks into their assembled relationship especially with extremely small buttons, constructed in accordance with this invention.

The essential concept of this invention involves a pair of perimetrically-flanged curved outer and inner disks predeterminedly dimensioned relatively and formed with oppositely-tapered flanges and an elastic cup-shaped element with an inwardly-extending rib so dimensioned with respect to the outer disk and so positioned in the cup cavity as to permit the superimposed assembly of the disks and a piece of fabric and interposed the perimetrical portion of the fabric between the flanges and thereby lock the disks in permanently nested relationship with the fabric tautened over the face of the outer disk.

A garment-button and a forming means embodying the foregoing concept comprises a pair of disks 11 and 12, in association with a piece of fabric 13, and an assembling element 14.

The disks 11 and 12, one the outer disk and the other the inner disk, preferably are curved in form, made of stamped, and preferably resilient, metal, of differing diameters at their bases and have perimetrical flanges 15 and 16, respectively, extending axially outward from the concave faces of the respective disks. As here shown, the disk 12 has an annular ridge or rib 27 embossed adjacently inward of the flange 16. Although the disk 12 might be formed plain, without any such rib, the rib 27 tends to enhance the resiliency of the perimetrical portion of the disk 12. This not only makes it easier to press the disk 12 into the disk 11 with the interposed fabric, but tends to increase the pressure of the flange 16 outwardly toward the flange 15 on the disk 11 with the interposed fabric 13.

For an outer disk, about ⅞ of an inch in diameter, the flange 15 is approximately ⅛ of an inch in axial height. For an inner disk 12, about ¾ of an inch in diameter the flange 16 is approximately 1/16 of an inch in axial height.

The flange 15 on the outer disk 11 is tapered radially inward from the concave face, whereas the flange 16 on the inner disk 12 is tapered radially outward from the concave face.

The relative tapers of these flanges 15 and 16 are such that the outside diameter 17 (FIG. 3) of the flange 16, at its outer edge, is approximately the same as or very slightly less than the inside diameter 18 (FIG. 3) of the flange 15 at its outer edge. Such diametrical difference generally would be less than the thickness of the heaviest fabric most likely to be used for button making with disks 11 and 12 of the above-noted dimensions.

The inner disk 11 has a central eye 19, whereby the finished button may be attached to the garment. As here shown, the eye is a looped wire with the oppositely-disposed bent-over ends extending through apertures in the disk 12 with the loop enough above the plane of the flange 16 to permit the insertion of a needle.

The button-forming element 14, as here shown, is a cupped-shaped annulus formed of elastic substance with an internal annular rib 20. The inside diameter 21 of the cavity 22 is substantially equal to the outside diameter of the finished fabric-faced button. The rib 20 is arcuate in form and axially spaced from the base of the cavity 22 so that the distance 23 (FIG. 5) is substantially the same as the over-all thickness 24 of the finished button (FIG. 3). The inside diameter 25 of the rib is just enough less than the dimension 21 to insure retention of the outer disk 11 with a piece of fabric 13 spread over the convex face *and bias the fabric inwardly over the edge of the flange 15* (see FIG. 7). As here shown, a central opening 26 is formed in the base of the element 14 to facilitate the ejection of the formed button.

Having a quantity of disks 11 and 12, the necessary pieces of fabric 13, and one of the elements 14, all as above set forth, the method of forming a fabric-faced garment-button, in accordance with this invention, involves the following steps;

(1) A piece of fabric 13 is placed concentrically over the open end of the element 14;

(2) The outer disk 11 is superimposed on the piece of fabric 13 and pressed down into the element 14 past the rib 20 into the cavity 22 of the element 13, as clearly indicated in FIG. 7;

(3) The perimetrical portion of the fabric 13 is folded down into the disk 11, as shown in FIG. 8;

(4) The inner disk 12 is superimposed on the folded-over portion of the fabric 13 (see FIG. 3) and the disk 12 is pushed down into the disk 11 (see FIGS. 9 and 3).

Pressing the disk 12 down into the disk 11, with the fabric interposed between the flanges 15 and 16, tends to spring the perimeters of the flanges 15 and 16, tends to to permit the perimeter of the flange 16 to pass below the fabric-covered perimeter of the flange 15 (see FIG. 3). The interposed fabric, drawn over the perimeters of the flanges 15 and 16, and the resiliency of the disks, serves to lock the disks 11 and 12 in permanently nested relationship. Also, the combined action of pressing the fabric down into the element 14 and pressing the disk 12 down into the disk 11 tends to tauten the fabric 13 over the convex face of the outer disk 11.

(5) Finally, the finished button is pressed out of the element 14 and is ready for use.

Where sheer fabric is to be used to face the disk 11, a piece of lining would be used to insure enough thickness of fabric to insure the retention of the inner disk 12 in the outer disk 11, as is certain to be the case with the more heavy fabric.

Kits of a dozen or so pair of disks 11 and 12 and one of the elements 14 are adapted for marketing, through dressmaking accessory outlets, for purchase by professional dressmakers or by persons who practice making their own clothes, to enable them to make fabric-faced buttons to match the garment, when such type of button is desired.

The hollow cylinder 28 shown in FIG. 10, is provided for use to push the disks into the element 14, especially when the diameters of the disks 11 and 12 are too small to effect this with the fingers of one's hand.

Variations and modifications in the details of structure and arrangement of parts may be resorted to within the spirit and coverage of the appended claims.

We claim:

1. A fabric-faced garment-button comprising, a perimetrically-flanged curved outer disk of predetermined diameter and having the flange tapered axially inward to a diameter at its outer edge less than the diameter of the disk base, a perimetrically-flanged similarly curved inner disk having the flange tapered outwardly and of an outside diameter at its outer edge enough less than the inside diameter of the outer disk flange at its outer edge *to permit the inner disk to be removably inserted into the outer disk when no fabric is interposed between the respective flanges,* the inner disk being formed with an annular embossment adjacently inward of the flange, and a piece of fabric overspreading the convex face of the outer disk with the perimetrical portion of the fabric interposed between the respective flanges of the two interfittingly nested disks *with the inner disk disposed entirely within the outer disk below the edge of the outer-disk flange and with the outer face of the inner disk opposed to the inner face of the outer disk* and coacting with the resiliency of the disks to lock the disks in undeformed permanently-nested relationship solely by the interposed fabric tautened over the face of the outer disk.

2. A fabric-faced garment-button comprising, a perimetrically-flanged curved outer disk of predetermined diameter having the flange tapered axially inward to a diameter at its outer edge less than the diameter of the disk base, a perimetrically-flanged and similarly curved inner disk having the flange tapered outwardly to a diameter at its outer edge greater than the diamteer of the disk base and of an outside diameter at its outer edge enough less than the inside diameter of the outer-disk flange at its outer edge to permit the inner disk to be removably inserted into the outer disk when no fabric is interposed between the respective flanges, a piece of fabric over-spreading the convex face of the outer disk with the perimetrical portion of the fabric being interposed between the respective flanges of the two interfittingly-nested disks *with the inner disk disposed entirely within the outer disk below the outer edge of the outer-disk flange and with the outer face of the inner disk opposed to the inner face of the outer disk* and locking the disks in undeformed permanently-nested relationship solely by the interposed fabric tautened over the face of the outer disk, the inner disk having a pair of radially-spaced apertures near the center of the disk, and an inverted U-shaped wire having the ends inserted through the disk apertures and bent transversely to retain the loop of the wire and form a less-than semi-circular opening outwardly of the plane of the flange of the outer disk.

3. A fabric-faced garment-button comprising, a perimetrically-flanged outer disk of predetermined diameter wherein the flange is tapered axially inward to a diameter at its outer edge less than the diameter of the disk base, a perimetrically-flanged and similarly-shaped inner disk wherein the flange is less in height than the outer disk flange and is tapered outwardly to a diameter at its outer edge greater than the diameter of the disk base and has an outside diameter at its outer edge enough less than the inside diameter of the outer-disk flange at its outer edge to permit the inner disk to be removably inserted into the outer disk when no fabric is interposed between the respective flanges, and a piece of fabric over-spreading the outer face of the outer disk with the perimetrical portion of the fabric interposed between the respective flanges of the two interfittingly-nested disks *with the inner disk disposed entirely within the outer disk below the outer edge of the outer-disk flange and with the outer face of the inner disk opposed to the inner face of the outer disk* and locking the disks in undeformed permanently-nested relationship solely by the interposed fabric.

[4. A kit for the manual formation of fabric-faced garment-buttons comprising, one or more pairs of similarly-shaped perimetrically-flanged outer and inner disks of slightly different diameters of preformed resilient material, the flange of the outer disk being tapered axially inwardly to a diameter at its outer edge less than the diameter of the disk base and the flange of the inner disk being tapered outwardly to a diameter at its outer edge greater than the diameter of the disk base, the inner disk flange being of less height than the outer-disk flange and having the outside diameter at the outer edge enough less than the inside diameter at its outer edge of the outer-disk flange to permit the inner disk to be removably inserted into the outer disk when no fabric is interposed between the respective flanges, and a cup-shaped element of elastic substance having an inwardly-extending annular rib intermediate the base and upper face thereof with an inside rib diameter slightly less than that of the cup cavity but approximately equal to the outside diameter of the outer disk at its base, the element being adapted to releasably seat an outer disk below the rib with the overlaid piece of fabric to permit the inner disk to be depressed into nesting relationship with the outer disk with the perimetrical portion of the fabric being interposed between the disks, whereby the disks are locked in undeformed permanently-nested relationship by the fabric between the opposed edges of the flanges.]

[5. An article of manufacture, for use in forming a fabric-faced garment-button, comprising a pair of similarly-shaped perimetrically-flanged outer and inner disks formed of resilient material, the flanges on the respective disks being oppositely tapered relative to their respective disk axes so that the diameters of the outer edges of the flanges are respectively less and greater than the diameters of the respective disk bases, the inner-disk flange being less in height than the outer-disk flange and having its outer-edge outside diameter enough less than the inside diameter of the outer edge of the outer-disk flange to permit the inner disk to be removably inserted into the outer disk when no fabric is interposed between the respective flanges, the disks being adapted to be locked in undeformed permanently-nested relationship solely by a piece of fabric, tautened over the inner disk, with its peripheral edge portion interposed between the nested flanges.]

6. A fabric-faced garment-button comprising, a pair of similarly-shaped perimetrically flanged interfitting disks formed of resilient material with the inner-disk flange shallower than the outer-disk flange and the flanges oppositely tapered toward each other at their outer edges and having the opposed inside and outside edge diameters enough different to permit the inner disk to be removably inserted into the outer disk when no fabric is interposed between the disk flanges but to insure the two disks being locked in undeformed permanently-nested relationship *with the inner disk disposed entirely within the outer disk below the outer edge of the outer-disk flange and with the outer face of the inner disk opposed to the inner face of the outer disk solely* by the perimetrical portion of a piece of fabric, overlying the outer disk, with its peripheral edge portion interposed between the disk flanges.

*7. An article of manufacture, for use in forming a fabric-faced garment-button, comprising a pair of perimetrically-flanged outer and inner disks formed of resilient material with the inner-disk flange shallower than and oppositely tapered relative to the outer-disk flange, the opposed inside and outside diameters of the respective flanges being enough different to permit the inner disk to be removably inserted into the outer disk, with the inner disk disposed entirely within the outer disk below the outer edge of the outer-disk flange and with the outer face of the inner disk opposed to the inner face of the outer disk when no fabric is interposed between the disk flanges but to insure the two disks being locked in undeformed permanently-nested aforesaid relationship by the perimetrical portion of a piece of fabric overlying the outer disk, with its peripheral edge portion interposed between the disk flanges.*

References Cited by the Examiner

The following references, cited by the Examiner, are of record in the patented file of this patent or the original patent.

UNITED STATES PATENTS

| | | | |
|---|---|---|---|
| 562,656 | 6/96 | Phelps | 24—113 X |
| 1,257,642 | 2/18 | Simons. | |
| 1,483,223 | 2/24 | Gaunt. | |
| 1,549,806 | 8/25 | Rosen et al. | |
| 2,433,986 | 1/48 | Forbes. | |
| 2,488,957 | 11/49 | Booth. | |
| 2,520,351 | 8/50 | Wolff. | |
| 2,640,238 | 6/53 | Schuhr. | |
| 2,716,794 | 9/55 | Zelenay. | |
| 2,717,434 | 9/55 | Duell. | |
| 2,930,093 | 3/60 | Dritz. | |

FOREIGN PATENTS

| | | |
|---|---|---|
| 232,746 | 4/25 | Great Britain. |
| 811,741 | 8/51 | Germany. |

FRANK E. BAILEY, *Primary Examiner.*